US007801690B2

(12) United States Patent
Veronesi et al.

(10) Patent No.: US 7,801,690 B2
(45) Date of Patent: Sep. 21, 2010

(54) TENSILE SUPPORT STRENGTH MEASUREMENT SYSTEM AND METHOD

(75) Inventors: William Veronesi, Hartford, CT (US); Norbert Hootsmans, South Glastonbury, CT (US)

(73) Assignee: Otis Elevator Company, Farmington, CT (US)

( * ) Notice: Subject to any disclaimer, the term of this patent is extended or adjusted under 35 U.S.C. 154(b) by 207 days.

(21) Appl. No.: 10/589,479

(22) PCT Filed: Mar. 16, 2004

(86) PCT No.: PCT/US2004/008192

§ 371 (c)(1), (2), (4) Date: Aug. 14, 2006

(87) PCT Pub. No.: WO2005/095250

PCT Pub. Date: Oct. 13, 2005

(65) Prior Publication Data

US 2007/0168159 A1 Jul. 19, 2007

(51) Int. Cl.
*G01L 1/00* (2006.01)

(52) U.S. Cl. ............................ 702/42; 702/34; 702/183

(58) Field of Classification Search ............. 702/33–36, 702/41, 43, 57, 64, 65, 182, 183, 185, 42; 187/391, 393

See application file for complete search history.

(56) References Cited

U.S. PATENT DOCUMENTS 4,936,136 A 6/1990 Vanhala
5,804,964 A * 9/1998 Hamelin et al. ............. 324/242
5,821,430 A * 10/1998 Kwun et al. ............. 73/862.41
5,921,352 A 7/1999 Garrido et al.
6,123,176 A * 9/2000 O'Donnell et al. .......... 187/393
6,133,731 A * 10/2000 Melamud et al. ............ 324/209
6,247,359 B1 * 6/2001 De Angelis .................. 73/158

(Continued)

FOREIGN PATENT DOCUMENTS

DE 39 34 654 A1 5/1991

(Continued)

OTHER PUBLICATIONS

International Preliminary Report on Patentability mailed May 15, 2006 regarding International Application No. PCT/US04/08192 filed Mar. 16, 2004.

(Continued)

*Primary Examiner*—Jeffrey R West
(74) *Attorney, Agent, or Firm*—Carlson, Gaskey & Olds PC

(57) ABSTRACT

A method and system determines probable strength degradation in a tensile support in an elevator system by monitoring an electrical characteristic of the tensile support as a whole, such as the total electrical resistance of the tensile support, that varies as the remaining strength in the tensile support varies. One example system determines a relationship between strength degradation and various physical factors, such as the rate of degradation for a given load (102), operating environment information for the tensile support (104), and estimated usage data (106), to obtain a map of mean degradation (100). This map of mean degradation (100) is then used to generate one or more maps linking the strength degradation and electrical characteristic.

23 Claims, 3 Drawing Sheets

U.S. PATENT DOCUMENTS

| | | | | |
|---|---|---|---|---|
| 6,260,343 | B1 * | 7/2001 | Pourladian | 57/200 |
| 6,405,833 | B1 * | 6/2002 | Baranda et al. | 187/254 |
| 6,608,487 | B2 * | 8/2003 | De Angelis | 324/539 |
| 6,653,943 | B2 | 11/2003 | Lamb et al. | |
| 6,662,660 | B2 * | 12/2003 | Smith | 73/597 |
| 6,752,029 | B2 * | 6/2004 | Madden et al. | 73/862.69 |
| 7,237,656 | B2 * | 7/2007 | Barrett et al. | 187/412 |
| 2002/0194935 | A1 * | 12/2002 | Clarke et al. | 73/862.391 |
| 2004/0046540 | A1 * | 3/2004 | Robar et al. | 324/71.2 |

FOREIGN PATENT DOCUMENTS

| | | | |
|---|---|---|---|
| JP | 06286957 | | 10/1994 |
| JP | 09-178611 | | 7/1997 |
| JP | 11035246 | | 2/1999 |
| JP | 11035246 | A * | 2/1999 |
| JP | 2001302135 | A * | 10/2001 |
| JP | 2002230196 | | 8/2002 |
| JP | 2004075221 | | 3/2004 |
| JP | 2004075221 | A * | 3/2004 |
| WO | WO 00/58706 | | 10/2000 |

OTHER PUBLICATIONS

Written Opinion of the International Preliminary Examining Authority mailed Jan. 23, 2006 regarding International Application No. PCT/US04/08192 dated Mar. 16, 2004.
International Search Report mailed Feb. 28, 2005 regarding International Application No. PCT/US04/08192 dated Mar. 16, 2004.
Supplementary European Search Report for Application No. EP 04 82 1855 dated Sep. 25, 2009.

* cited by examiner

TENSILE SUPPORT STRENGTH MEASUREMENT SYSTEM AND METHOD

TECHNICAL FIELD

The present invention relates to evaluating strength in a tensile support, and more particularly to a system and method that monitors tensile support strength based on electrical characteristics of the tensile support.

BACKGROUND OF THE INVENTION

Tensile supports, such as coated steel belts or wire ropes containing metal cords, are used to move an elevator car up and down within an elevator shaft. Because the condition of the tensile support is critical to safe operation of the elevator, there is a need to determine the remaining strength level of the tensile support and detect if the remaining strength level falls below a minimum threshold.

Tensile support strength can be reduced by normal operation of the elevator. The primary source of tensile support strength degradation is the cyclic bending of the tensile support around sheaves as the elevator is moved up and down in an elevator shaft. Tensile support degradation is normally not uniform along the length of the tensile support; instead, areas of the tensile support subjected to high levels or severities of bending cycles will degrade faster than areas experiencing fewer bend cycles.

Some electrical characteristics, such as electrical resistance or impedance, of the cords in the tensile support will vary as the cross-sectional area of the cords decrease. Thus, it is theoretically possible to determine the remaining support strength of the tensile support based on the cords' electrical characteristics. However, as noted above, weaker spots in the tensile support are usually distributed over the tensile support in varying fashions depending on elevator usage (e.g., speed, acceleration, jerk, etc.), elevator system layout, the cord material, manufacturing variables, and other factors, making it difficult to determine exactly when and where the tensile support may have reached its minimum remaining strength. Without a quantitative method relating an electrical characteristic of the tensile support with the remaining tensile support strength, electrical monitoring of the tensile support can only reveal whether the tensile support is intact or broken.

There is a desire for a system and method that can quantitatively indicate a remaining strength level of cords in a tensile support based on electrical characteristics of the cords, and therefore the electrical characteristic of the tensile support.

SUMMARY OF THE INVENTION

The present invention is directed to a method and system that can determine strength degradation in a tensile support based on an electrical characteristic, such as electrical resistance. One example system determines a relationship between strength degradation and various physical factors, such as the rate of degradation for a given load, operating environment information for the tensile support, and estimated or actual usage data, to obtain a map of mean degradation. This map of mean degradation is then used to generate one or more maps linking the strength degradation (i.e., in the form of a remaining strength percentage) and an electrical characteristic, such as resistance, that varies as the remaining tensile support strength varies. Based on these electrical characteristic maps, it is possible to detect when the tensile support has lost a given level of strength by measuring the electrical characteristic.

In one embodiment, variances in the degradation rate of the tensile support, the relationships between the electrical characteristic and strength degradation, temperature, and/or electrical devices used to measure the electrical characteristic are taken into account to generate the electrical characteristic maps.

DETAILED DESCRIPTION OF THE EMBODIMENTS

As noted above, the strength of a tensile support is related to the cross-sectional area of the cords in the tensile support and accumulated breaks in the cords as the tensile support is bent and unbent around one or more sheaves during elevator operation. Empirical testing can yield a strength loss model linking the loss in tensile support strength and elevator operation factors, such as tensile support loading, sheave geometry (e.g., sheave diameter), and the number of bend cycles. In other words, the model provides a relationship between a constant load and the rate of strength degradation caused by the constant load.

Because different sections of the tensile support lose strength at different rates, it is desirable to generate a map of mean degradation to predict the amount of strength degradation for any section in the tensile support. As a practical matter, it is virtually impossible to locate the weakest portion of the tensile support directly. However, because weakened portions of the tensile support are distributed over the entire tensile support length during use, the resistance of the entire tensile support can be an accurate indication of the weakest section in the tensile support, which dictates the tensile support's remaining strength.

Figure 1:
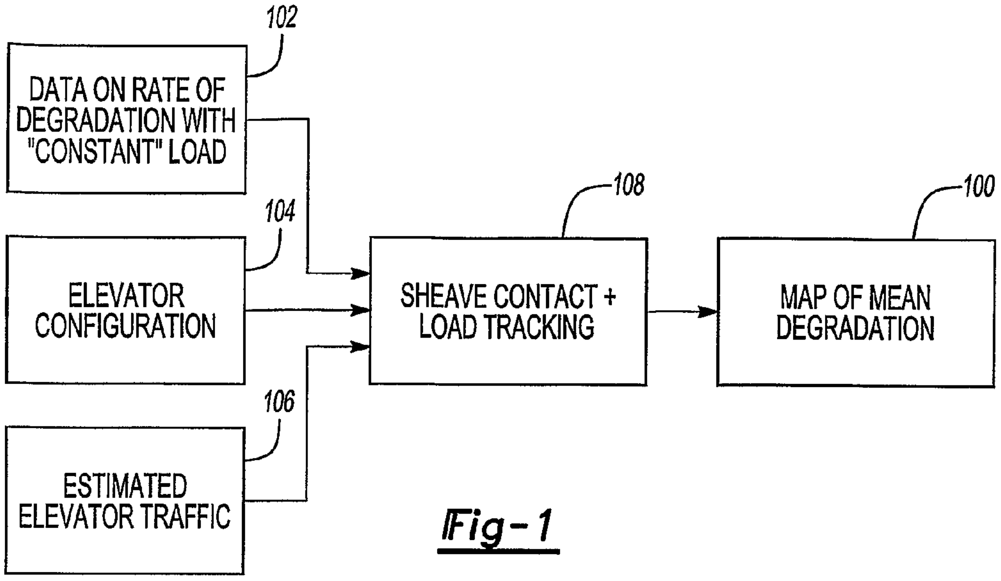
FIG. 1 is a block diagram of a process for generating a map of mean degradation according to one embodiment of the invention.

FIG. 1 illustrates one method of generating the map of mean degradation 100. In this embodiment, the map 100 is generated based on a strength loss model 102 for the elevator system being considered, the elevator configuration 104 and the estimated elevator traffic 106. Each of these components will be explained in greater detail below.

To obtain the strength loss model 102, the rate of degradation of the tensile support for a given constant load is obtained empirically. In one embodiment, repeated bend cycles are applied to a plurality of sample tensile supports 50 until they break. This can be conducted using any known fatigue machine 60. From this information, it is possible to determine a statistical distribution of the number of bend cycles required to bend a given tensile support to failure for a known constant load.

The remaining strength in the tensile support is also dictated by the elevator configuration 104, such as the number of sheaves in the elevator system, tensile support routing around the sheaves, the distance between the sheaves, and the sheave configuration. The estimated elevator traffic 106, such as frequency of use, average passenger weight, etc., is also considered in generating the mean degradation map. Usage details, such as the number of times the elevator moves between certain floors, directly affects the location and amount of degradation in the tensile support. Taking estimated elevator traffic 106 and the elevator configuration 104 into account keeps track of the number of times a sheave contacts a particular section of the tensile support and the tension at that time. This is tracked via a sheave contact and load tracking algorithm 108. From this information, it is possible to predict a wear state of a given section of the tensile support and therefore predict the remaining strength of the entire tensile support.

The mean degradation map 100 for a given elevator configuration 104 can be analyzed statistically by varying the estimated elevator traffic data 106 and the data on the degradation rate 102 and data 108 for monitoring the effects of the load at areas where the sheave contacts the tensile support in different load and traffic situations. The resulting map of mean degradation 100 provides a statistical distribution of strength degradation for a particular elevator system for a given constant load. In other words, the map of mean degradation 100 indicates a range of bend cycles in which the tensile support is expected to fail for a type of elevator system.

Figure 2:
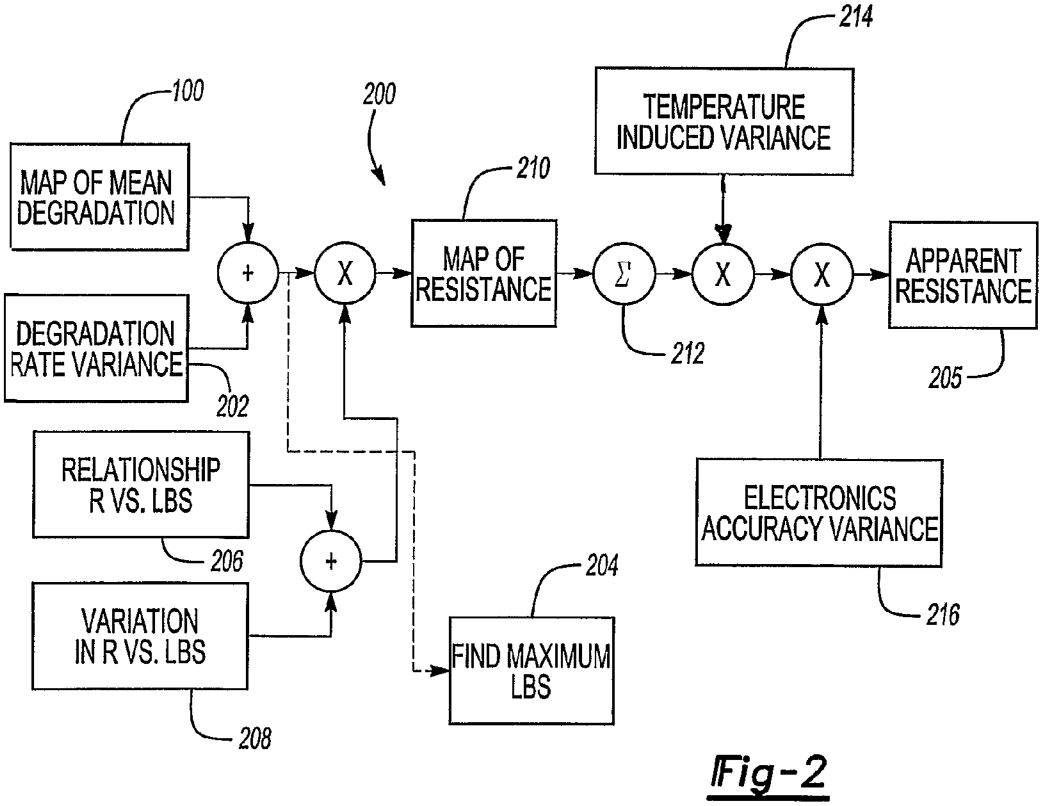
FIG. 2 is a block diagram of a process for determining an apparent resistance according to one embodiment of the invention.

To detect remaining strength in the tensile support based on an electrical characteristic, such as electrical resistance, the information in the map of mean degradation 100 needs to be linked with the electrical characteristics of the tensile support, preferably in the form of electrical characteristic maps. FIG. 2 is a block diagram illustrating a process 200 according to one embodiment of the invention to determine the relationship between electrical resistance and remaining strength.

To generate the electrical resistance maps in this embodiment, the degradation map 100 is first considered with a degradation rate variance 202, which reflects the uncertainty in the degradation rate reflected by the map 100. Although the map of mean degradation 100 provides a range of possible values, the range itself reflected in the map 100 may also vary. The degradation rate variance 202 takes this into account when determining the resistance maps. The amount of variance can be determined empirically.

Evaluating the degradation map 100 with respect to the degradation rate variance 202 generates a range of usage patterns and wear rates of the tensile support and produces a range of minimum tensile support strength and/or maximum loss in breaking strength (LBS) 204, which reflects the maximum amount that the tensile support strength can be degraded. More particularly, the maximum LBS can be determined by detecting the point in the degradation map at which the tensile support strength is the lowest, after taking the degradation rate variance 202 into account, and then using this point as the maximum LBS value 204. The maximum LBS 204 indicates the point at which the tensile support would break if placed under extreme load.

This maximum LBS 204 value that can be linked with an apparent resistance 205 value, which will be described in greater detail below. From this link, an operator can be alerted to a weak tensile support condition when the apparent resistance 205 reaches a value corresponding to the maximum LBS 204.

Note that linking the relationship between the resistance and the LBS for multiple tensile supports only provides a range of possible resistance values for the maximum LBS. Additional analysis, which will be explained below, is needed to obtain the relationship between resistance values and strength characteristics other than the LBS.

As noted above, the loss in the cross-sectional area of the cords in the tensile support and accumulation of breaks in the cords may affect electrical characteristics of the tensile support, such as increase the electrical resistance. In the example shown in FIG. 2, a relationship between the electrical resistance R and the LBS is developed empirically and analytically to generate an R vs. LBS map 206. Because the relationship between the resistance R and the LBS can vary randomly among tensile supports due to uncontrollable factors, such as manufacturing variables and differing material properties, the process 200 simulates these random variations in a variation map 208 and adds them to the R vs. LBS map 206.

The modified degradation map 100, 202 and the modified R vs. LBS map 206, 208 are incorporated together to generate an electrical resistance map 210, which reflects the electrical resistance at any given section of the tensile support. As shown in the Figure, corresponding map points in the modified degradation map 100, 202 and the modified R vs. LBS map 206, 208 are multiplied together to obtain the resistance map 210. The total resistance of the tensile support at any given time can be calculated by summing 212 the resistances of the tensile support sections together.

Temperature changes and variations among electronic devices in the elevator system may change the apparent resistance of the tensile support. In general, the effects of temperature-induced variances 214 and electronic device variances 216 can be determined experimentally and/or analytically. For example, the effect of temperature changes on the tensile support resistance can be calculated as well as empirically measured, while variances in electronic devices can be empirically determined through testing. The process 200 incorporates the effects of temperature-induced variance 214 and electronic device variances 216 on the resistance value to generate a resistance map that reflects the possible values of the apparent resistance 205. Alternatively, if the temperature along the tensile support is known or simulated, the temperature variance may be applied to each value in the resistance map 210 before the summation 212 is performed.

Thus, the analysis shown in FIGS. 1 and 2 generates a distribution of minimum remaining tensile support strength estimates and a corresponding distribution of apparent resistances corresponding to the strength estimates. These distributions can be analyzed statistically to produce probability estimates of remaining tensile support strength for selected electrical resistances.

Figure 3:
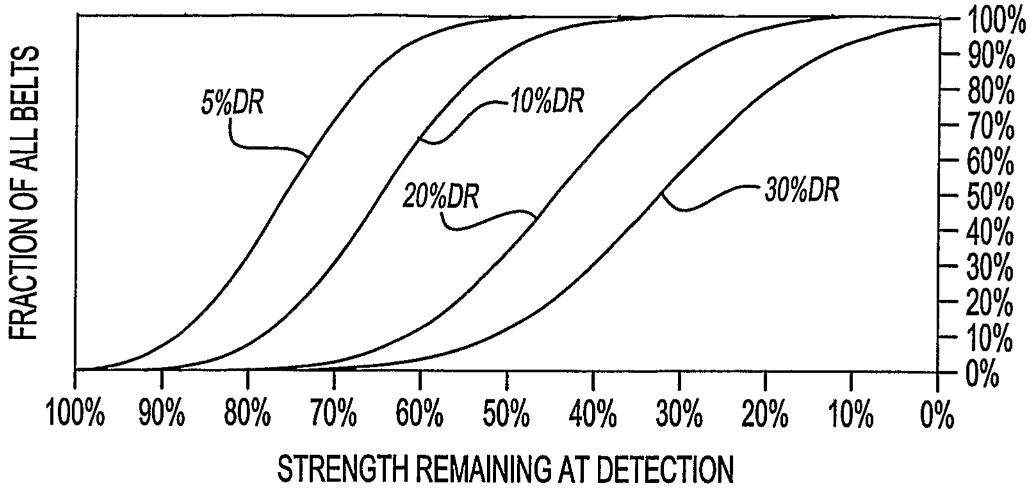
FIG. 3 is a plot of remaining strength probabilities for given increases in apparent resistance according to one embodiment of the invention.

FIG. 3 is a graph illustrating one possible relationship between changes in the apparent, total tensile support resistance and the probability estimates of remaining tensile support strength. As shown in the Figure, the larger the percentage increase in the apparent resistance (shown in FIG. 3 as "DR"), the lower the amount of remaining strength in the tensile support. The distributions shown in FIG. 3 illustrate the percentage of tensile supports having a given percentage of remaining strength for a given percent increase in apparent resistance. From this graph, it is simple to estimate the amount of strength remaining in a tensile support based on the amount its resistance has increased.

In another embodiment, the map of mean degradation 100 used to calculate the apparent resistance and determine the strength probability map is based on actual elevator usage data instead of simulated or historical data. To obtain this embodiment, actual elevator usage data can be substituted for the estimated elevator traffic 106 in FIG. 1.

The actual elevator usage data may be continuously fed to the sheave contact and load tracking algorithm 108 so that the map of mean degradation 100, and therefore the apparent resistance values 205 and corresponding resistance maps, can be updated continuously as more data regarding the elevator usage is obtained. In addition to the elevator usage factors used to estimate tensile support degradation, this embodiment also considers how the elevator is actually used and takes passenger loads and the severity and number of bend cycles in any section of the tensile support into account. Because the strength probability estimates are based on actual elevator usage, the estimates of the remaining strength levels obtained in this embodiment will likely have a narrower range than those in the first embodiment, which encompasses a broad range of possible elevator usage.

Figure 4:
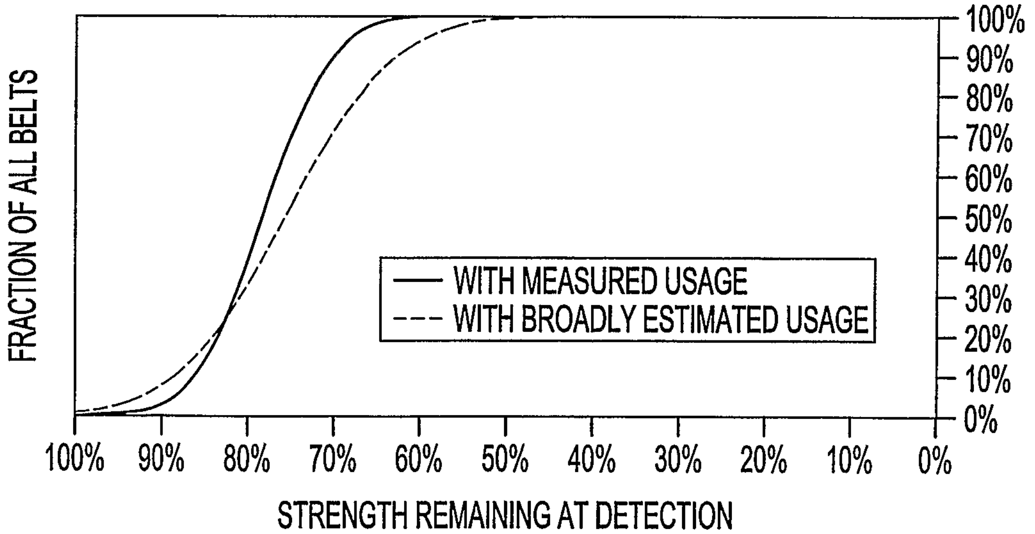
FIG. 4 is a plot of remaining strength probabilities for an estimated usage and for an actual usage according to another embodiment of the invention.

FIG. 4 shows a comparison between an estimate of remaining tensile support strength based on estimated elevator usage versus actual elevator usage. The actual elevator usage data provides an electrical resistance value that improves the estimate of the remaining tensile support strength for a given elevator system, making it possible to set action thresholds in an elevator health monitoring system that are relevant to the particular elevator system being monitored.

Figure 5:
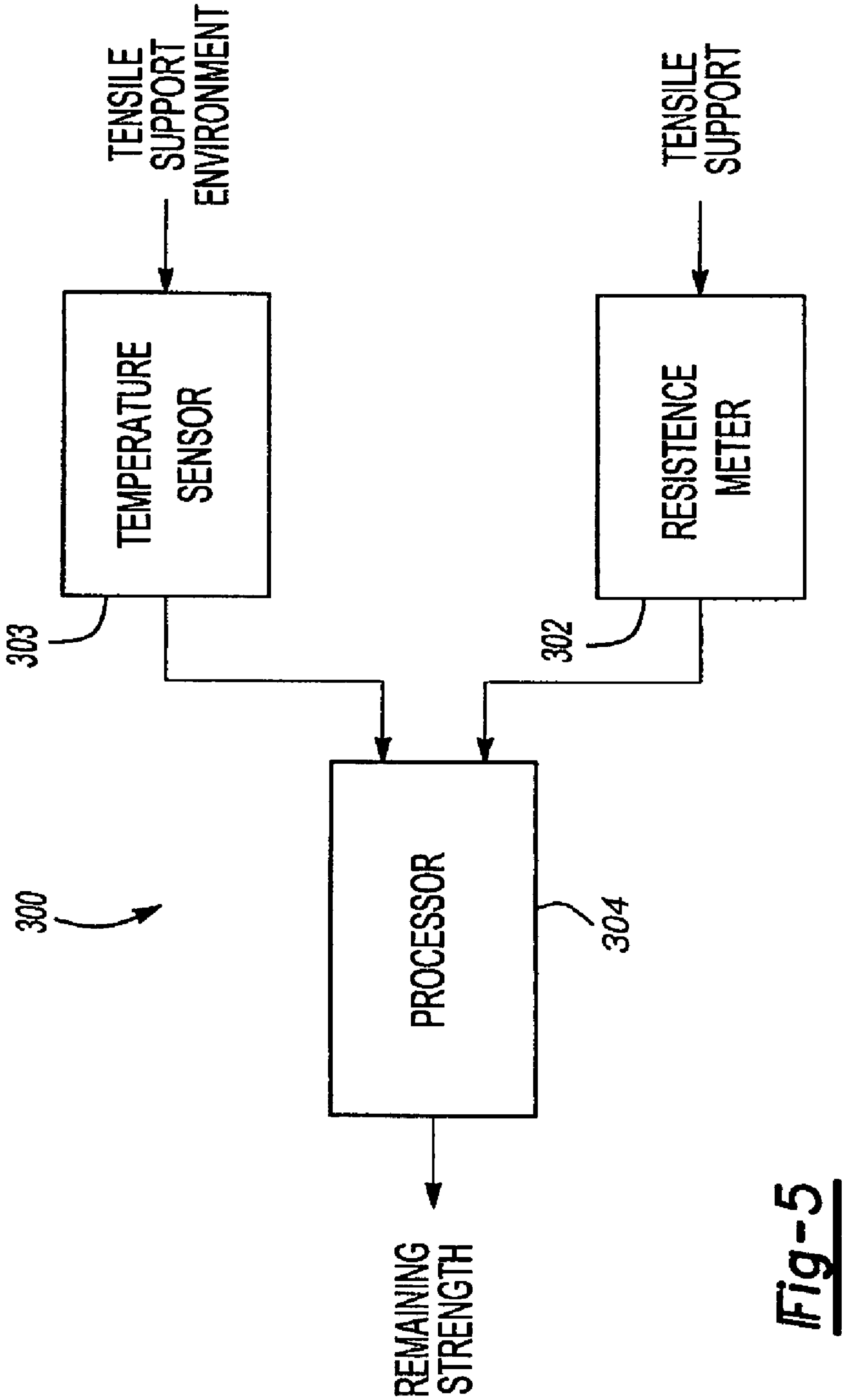
FIG. 5 is a block diagram illustrating one possible implementation of the invention.

FIG. 5 is a representative diagram of a system that evaluates tensile support strength as described above. Generally, the system 300 should include at least one electrical characteristic measurement device, such as a resistance meter 302, that monitors the tensile support and a temperature measurement device 303 that monitors the tensile support's environment. The system 300 also includes a processor 304 that generates the maps described above from the measured electrical and temperature characteristics and determines the probable remaining strength in the tensile support. The specific components to be used on the system 300 can be selected by those of ordinary skill in the art.

By measuring the tensile support strength based on an electrical characteristic, such as electrical resistance, the invention can monitor the remaining strength level of the tensile support, detect a minimum remaining strength level and, if desired, prompt action based on the remaining strength level. Although the examples described above focus on tensile supports used in elevator applications, such as coated steel belts, the invention can be used to monitor the strength of any structure whose electrical characteristics vary based on tensile support strength. Further, although the examples above focus on correlating resistance with remaining strength, other electrical characteristics can be monitored and used. The invention can be implemented in any known manner using any desired components; those of ordinary skill in the art will be able to determine what devices are needed to obtain the electrical characteristic data, obtain simulation data, and generate programs that can carry out the invention in a processor, for example.

It should be understood that various alternatives to the embodiments of the invention described herein may be employed in practicing the invention. It is intended that the following claims define the scope of the invention and that the method and apparatus within the scope of these claims and their equivalents be covered thereby.

We claim:

1. A method of modeling a condition of an elevator tensile support, comprising;

determining a rate of degradation of the tensile support for a selected load using at least one sample tensile support and a fatigue machine;

modeling a configuration of at least one selected elevator system;

estimating an elevator traffic pattern;

determining sheave contact and load information using the modeled configuration and the estimated elevator traffic pattern;

determining a mean degradation of the tensile support from the determined rate of degradation and the determined sheave contact and load information;

generating a first map from the determined mean degradation;

generating a second map correlating an electrical characteristic with a selected degree of strength degradation; and combining the first and second maps to generate a third map correlating the electrical characteristic with a remaining strength in the tensile support.

2. The method of claim 1, including determining a plurality of mean degradation values by varying at least one of the modeled configuration or the estimated elevator traffic pattern.

3. The method of claim 1, including determining a relationship between an electrical characteristic and a selected condition of the tensile support and using the determined relationship and the determined mean degradation for determining an apparent electrical characteristic value corresponding to the selected condition of the tensile support.

4. The method of claim 3, including repeatedly performing the steps of claim 3 to determine a plurality of the apparent electrical characteristic values and using the plurality of the apparent electrical characteristic values to determine a relationship between a corresponding measured electrical characteristic and a condition of a tensile support.

5. The method of claim 4, wherein the electrical characteristic is resistance.

6. The method of claim 5, including subsequently measuring a resistance of a tensile support and using the determined relationship between resistance and the selected condition of the tensile support to determine a current condition of the tensile support.

7. The method of claim 1, wherein the step of generating the first map comprises incorporating at least one tensile support operational factor with the determined rate of degradation.

8. The method of claim 7, wherein said at least one tensile support operational factor is selected from the group consisting of an elevator system configuration, estimated elevator traffic, actual elevator usage, and sheave contact.

9. The method of claim 8, wherein said at least one tensile support operational factor is the actual elevator usage, and wherein the step of generating the first map further comprises using an updated actual elevator usage.

10. The method of claim 1, wherein the combining step comprises:

generating an intermediate map that correlates the electrical characteristic with remaining strength in a segment of the tensile support, wherein the tensile support comprises a plurality of segments; and summing the remaining strengths of the plurality of segments to generate the third map.

11. The method of claim 1, comprising incorporating a degradation rate variance factor in the first map.

12. The method of claim 1, comprising incorporating an electrical characteristic variance factor in the second map.

13. The method of claim 1, comprising incorporating at least one of a temperature-induced variance factor and an electronic device variance factor to generate the third map.

14. The method of claim 1, wherein the electrical characteristic is resistance.

15. The method of claim 1, comprising using the fatigue machine to apply repeated bend cycles to the at least one sample tensile support.

16. A system for determining a condition of an elevator tensile support, comprising:

a device for measuring an electrical characteristic of at least a portion of the tensile support; and a controller that determines a current condition of the tensile support by relating the measured electrical characteristic to a predetermined data set indicating a relationship between corresponding apparent characteristic values and conditions of the tensile support, the relationship being based upon at least one of a determined rate of degradation of the tensile support for a constant load, a modeled configuration of an elevator system, an estimated elevator traffic pattern, or a mean degradation of the tensile support based upon determined sheave contact and load information, wherein the controller determines a rate of degradation of the tensile support for a selected load;

models a configuration of at least one selected elevator system;

estimates an elevator traffic pattern;

determines sheave contact and load information using the modeled configuration and the estimated elevator traffic pattern;

determines a mean degradation of the tensile support from the determined rate of degradation and the determined sheave contact and load information;

generates a first map from the determined mean degradation;

generates a second map correlating an electrical characteristic with a selected degree of strength degradation; and combines the first and second maps to generate a third map correlating the electrical characteristic with a remaining strength in the tensile support.

17. The system of claim 16, wherein the controller determines a relationship between an electrical characteristic and a selected condition of the tensile support and uses the determined relationship and the determined mean degradation for determining an apparent electrical characteristic value corresponding to the selected condition of the tensile support.

18. The system of claim 17, wherein the controller determines a plurality of the apparent electrical characteristic values and uses the plurality of the apparent electrical characteristic values to determine a relationship between a corresponding measured electrical characteristic and a condition of a tensile support.

19. The system of claim 16, wherein the electrical characteristic is resistance.

20. A controller useful for determining a condition of an elevator tensile support, comprising:

a non-transitory storage medium containing programming for determining a rate of degradation of the tensile support for a selected load;

modeling a configuration of at least one selected elevator system;

estimating an elevator traffic pattern;

determining sheave contact and load information using the modeled configuration and the estimated elevator traffic pattern;

determining a mean degradation of the tensile support from the determined rate of degradation and the determined sheave contact and load information;

generating a first map from the determined mean degradation;

generating a second map correlating an electrical characteristic with a selected degree of strength degradation; and combining the first and second maps to generate a third map correlating the electrical characteristic with a remaining strength in the tensile support.

21. The controller of claim 20, including programming for determining a plurality of mean degradation values by varying at least one of the modeled configuration or the estimated elevator traffic pattern.

22. The controller of claim 20, including programming for determining a relationship between an electrical characteristic and a selected condition of the tensile support and using the determined relationship and the determined mean degradation for determining an apparent electrical characteristic value corresponding to the selected condition of the tensile support.

23. The controller of claim 22, including programming for determining a plurality of the apparent electrical characteristic values and using the values to determine a relationship between a corresponding measured electrical characteristic and a condition of a tensile support.

* * * * *